No. 745,510. PATENTED DEC. 1, 1903.
D. W. McLAUGHLIN.
TRACTION WHEEL.
APPLICATION FILED FEB. 2, 1903.
NO MODEL.
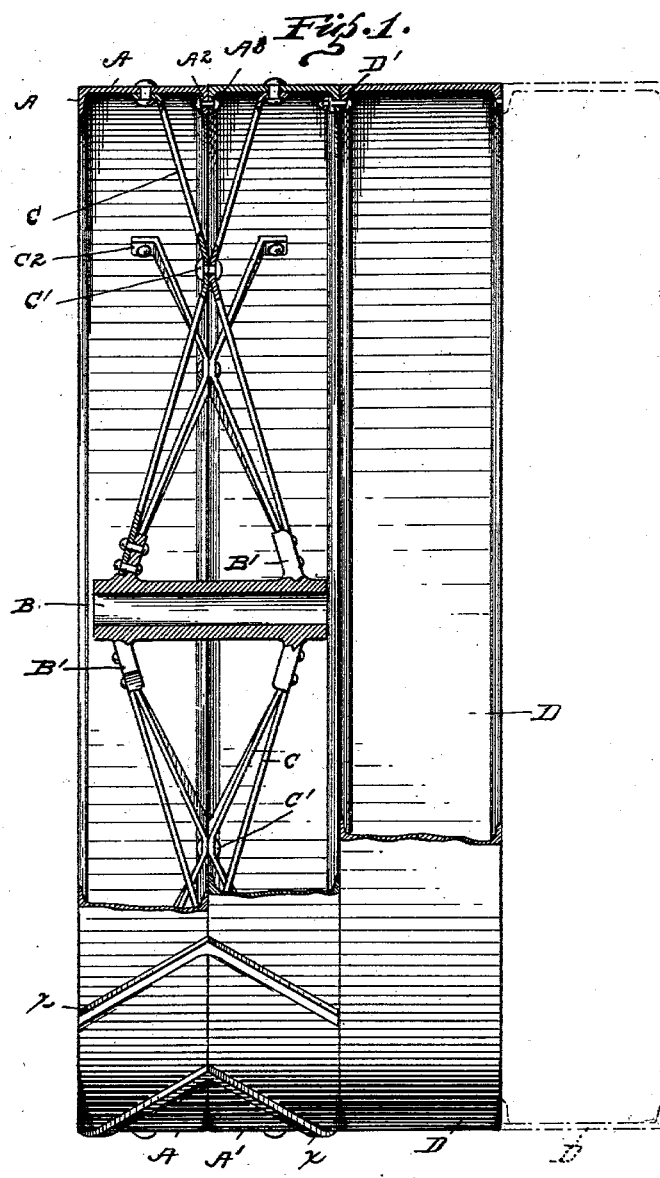
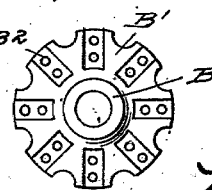
WITNESSES: INVENTOR.
Chas J. Hasman Dennis W. McLaughlin
John T. Nourse BY
ATTORNEYS.

No. 745,510.

Patented December 1, 1903.

UNITED STATES PATENT OFFICE.

DENNIS W. McLAUGHLIN, OF SAN FRANCISCO, CALIFORNIA.

TRACTION-WHEEL.

SPECIFICATION forming part of Letters Patent No. 745,510, dated December 1, 1903.

Application filed February 2, 1903. Serial No. 141,571. (No model.)

*To all whom it may concern:*

Be it known that I, DENNIS W. MCLAUGHLIN, a citizen of the United States, residing at 2711 Howard street, in the city of San Francisco, county of San Francisco, and State of California, have invented certain new and useful Improvements in Traction-Wheels; and I do hereby declare the following to be a full, clear, and exact description of the said invention, such as will enable others skilled in the art to which it most nearly appertains to make, use, and practice the same.

This invention relates to improvements in traction-wheels, and particularly to the rim and spoke construction thereof, and has for its object to provide a construction of few parts, combining extreme rigidity with lightness, and, further, to provide means for readily adding breadth to the tread of the wheel.

This invention consists, broadly, of a wheel having its rim formed of a continuous length of channel-iron bent with the flanges extending inwardly and having its ends butt-welded or otherwise suitably connected. The spoke construction consists of sets of two flat strap-spokes radiating from a cast hub to the rim, the spokes converging from opposite ends of the hub to a point intermediate the hub and the rim and being tied thereat by a rivet, then diverging to opposite sides of the center of the rim, whereby the spokes form a truss between the hub and rim without crossing each other.

Owing to the weight, power, and general abuse of traction-engines, rigidity and simplicity become primary demands in their construction. This is particularly true of the traction-wheels upon which the weight is carried and the whole engine force centered. Said wheels must meet all the jars and strains incident to rough roads without loss of alinement, as slight variations in the latter will result in throwing the driving-gear out of pitch. Heretofore the greatest difficulty has been in preserving the contour of the rim of the wheel, to which end various constructions have heretofore been employed, ranging from a solid cast rim to rims built up of many parts, all more or less expensive and unsatisfactory and none reliable. The side flanges on the rim have also been riveted to the rim or the rim shrunk onto the flanges; but neither method has been found to be effective. Adjustable spokes of whatever nature require constant adjustment and tinkering to preserve the contour of the rim. The various parts in this construction bear a positive fixed relation to each other, alterable only by breakage, the few parts reducing the liability of disadjustment to the minimum.

In the drawings, Figure 1 is a vertical cross-section of a traction-wheel constructed in accordance with this invention, a portion of the rim being shown in full lines to show the grouches on the tread. Fig. 2 is a side elevation of the hub of the wheel.

In detail the construction consists of the circumferential rim formed of the continuous lengths of channel-iron A A', having their inner flanges $A^2$ $A^3$ riveted together and their abutting ends suitably joined, the lateral joints being offset—that is, set on the opposite diameters of the wheel for a better balance and distribution of the strains.

The above construction forms a rim having a flat tread and inturned flanges at the sides and at the center of the rim, giving great vertical and lateral stiffness. The grouches $x$, extending across both rims A A', also add lateral stiffness. The hub B is provided with the flanges B', in which are formed the sockets $B^2$, into which the ends of the spokes C are bolted or riveted. The spokes consist of a set of two flat straps of steel C, having their hub-terminals fixed in the sockets $B^2$ and converging to the tie-rivet C', from which they diverge to opposite sides of the center of the rim, terminating in the head $C^2$, bolted to the inner side of the rim. By thus trussing the spokes a direct support and bracing is given to the rim with a much less tensile strain on the spoke, insuring greater stiffness in the wheel as a whole.

In agricultural work (plowing particularly) the softness and unevenness of the ground, often broken by large cracks, necessitates great breadth in the tread of the wheel to prevent the engine sinking too deeply. In many instances a breadth of five feet is necessary. To give a wide range of breadth, a series of units D are used, consisting of a rim made up exactly as the rim of the wheel as described, the flanges D' bolting to the flanges on the rim of the wheel in such a manner that unit may be bolted to unit until the desired width is reached. Particular stress is laid upon the fact that the flanges are integral with the rim. In narrow-tread wheels the rim may be formed of a single width of channel-iron. The construction illustrated and described applies to wheels approximating eight feet in diameter and weighing near a ton and a half or two tons.

It is obvious that the construction may be modified to said circumstances without altering the spirit of the invention.

Having thus described this invention, what I claim, and desire to secure by Letters Patent, is—

1. A traction-wheel having a rim composed of two continuous lengths of channel-iron bent in the form of a complete circle, and having their side flanges riveted together to form a rim with a flat tread and inwardly-extending flanges; a hub having flanges at each end from which spokes radiate; spokes extending between the said rim and hub in sets of two, converging from the flanges on the hub to a point intermediate the rim and hub and tied thereat by a rivet, from which they diverge to opposite sides of the center of the rim to which they are fixed; and an extension-rim composed of a continuous length of channel-iron bent to form a complete circle, having inturned flanges bolted to the flanges on the side of the rim of the wheel.

2. A traction-wheel having a rim composed of channel-iron bent to form a complete circle; spokes converging from opposite ends of the hub to a point intermediate the hub and rim, and tied thereat by a rivet from which they diverge to opposite sides of the center of the rim; and an extension-rim composed of a continuous length of channel-iron bent to form a complete circle, having its side flange bolted to side flange of the rim of the wheel.

3. A traction-wheel having a rim composed of channel-iron bent to form a complete circle; and spokes converging from opposite ends of the hub to a point intermediate the hub and rim, and tied thereat, from which point they diverge to opposite sides of the center of the rim.

4. A traction-wheel having a rim composed of channel-iron bent to form a complete circle, a hub, and spokes, the opposite ends of which diverge laterally from a point intermediate said rim and hub.

5. A traction-wheel having a rim and spokes, consisting of flat straps of steel converging from opposite ends of the hub to a point intermediate the hub and rim, and tied thereat by a rivet from which they diverge to opposite sides of the center of the rim.

In testimony whereof I have hereunto set my hand this 12th day of January, 1903.

DENNIS W. McLAUGHLIN.

Witnesses:
 BALDWIN VALE,
 V. BERKA.